UNITED STATES PATENT OFFICE.

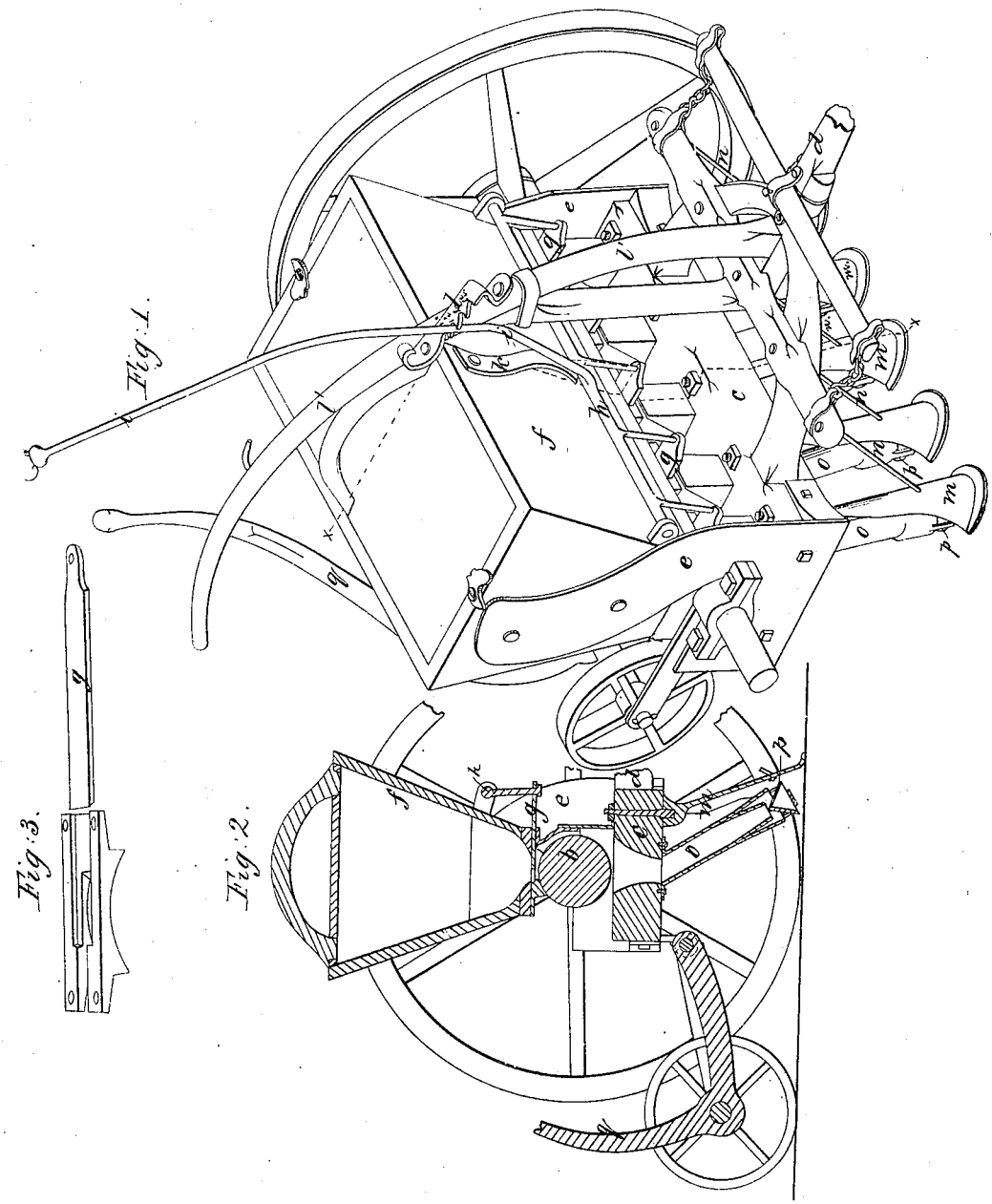

JACOB MUMMA, OF HUMMELSTOWN, PENNSYLVANIA.

IMPROVEMENT IN SEED-DRILLS.

Specification forming part of Letters Patent No. 6,885, dated November 20, 1849.

*To all whom it may concern:*

Be it known that I, JACOB MUMMA, of Hummelstown, in the county of Dauphin and State of Pennsylvania, have invented certain Improvements in Seed-Drills; and I do hereby declare that the following is a full, clear, and exact description of the principle or character which distinguishes it from all other things before known, and of the usual manner of making, modifying, and using the same, reference being had to the accompanying drawings, making a part of this specification, in which—

Figure 1 is a perspective view; Fig. 2, a vertical section.

The object of my invention is to secure an equal distribution of seed in the drills, either in ascending or descending hills, to regulate the exact quantity sown per acre, and to distribute the seed in the drill so that it will be more perfect in its growth and yield more than those in ordinary use.

The parts are constituted as follows: There is a pair of carrying-wheels, the one of which only is fixed to the axle, so as to cause it to turn with it. The other wheel, being loose, enables the machine to turn readily.

On the revolving axle there is a series of plain narrow rollers or pulleys, $b$, as many in number as there are teeth in the drill, one roller being over each tooth.

A frame, $c$, is supported by said wheels, from which a pole projects to draw it by.

The bearings of the axle-journals are connected with the frame $c$ by side plates, $e$, so that the teeth can be raised or lowered to suit the soil in which it is worked.

The hopper $f$ is affixed to and supported by the same plate, so as to always maintain the same relative position to the pulleys, or the axle.

Over each of the pulleys $f$ there is a mouth-piece of cast-iron. (Shown detached in Fig. 3.) The pulley fits in a concave groove on the under side of this mouth-piece, through which there is a mortise covered in whole or in part by a slide, $g$, that fits into a recess made for it in the mouth-piece, which latter is attached to the hopper and freely receives the grain from it.

All the slides $g$ project in front of the hopper, and are connected with a horizontal shaft, $h$, by vertical arms. This shaft $h$ is moved by a long lever, $i$, affixed near its center, that extends up in a curved line over the hopper and terminates in a handle, by which it is acted upon to move the slides out. They are closed by a spring, $k$, to regulate the quantity of grain sown to the acre.

I have a catch, $l$, with a series of notches on it and affixed to a bar, $l'$, projecting up beside the lever $i$. The notches are determined and numbered to the quantity of grain to the acre. Thus when the lever is put in the notch 1 it will sow one bushel to the acre; when in 1½, it will sow one bushel and a half, and so on to any other number.

The teeth $m$ are made hollow and with a broad base—say four inches across. They open the drill for the reception of the seed, and are firmly attached to the cross-beam of the frame $c$ above, as clearly shown in the drawings. The teeth are braced by iron rods $n$, which are attached to the teeth in front and extend up to a brace in an angular direction. These confine them in place behind the tenth tube, $o$, and placed with their open end directly under the pulleys, and receive the seeds and convey them down directly behind the teeth, where they strike a conical plate, $p$, (see Fig. 2,) and are distributed equally in the drill.

In all directions I deem this device very important in perfecting the sowing of the seed.

When the sowing is to be stopped the lever $i$ is to be thrown off, and the slides are closed by spring $k$.

To the hind part of the frame $e$ a small trunk is jointed, with a long lever, $q$, attached to it, by which the whole seeding apparatus is raised from the ground. It is transported from place to place.

Having thus fully described my improvements, what I claim therein as new, and for which I desire Letters Patent, is—

1. The combination of the plain pulleys $b$, mouth-pieces, and slides $g$, operating, as above set forth, for regulating the discharge of the grain.

2. The conical plates $p$ at the lower end of the tubes for distributing grain.

JACOB MUMMA.

Witnesses:
J. J. GREENOUGH,
N. H. HUTTON.